United States Patent Office 2,750,001
Patented June 12, 1956

2,750,001

TANDEM OIL BATH FILTER

George M. Walton, Shaker Heights, Ohio, assignor to Air Maze Corporation, Cleveland, Ohio, a corporation of Delaware Application August 25, 1953, Serial No. 376,447

7 Claims. (Cl. 183—15)

This invention relates to improvement in filters and more particularly in tandem oil bath filters.

An object of the present invention is to provide a filter having great filtering capacity for a given space.

Another object is to provide a highly efficient oil bath filter to be used in a vertically extending space which is generally long and narrow.

Other features of this invention reside in the arrangement and design of the parts for carrying out their appropriate functions.

Other objects and advantages of my invention will be apparent from the accompanying description and drawings, and the essential features thereof will be set forth in the appended claims.

Liquid bath filters of the type shown and described herein are commonly used for the air intakes of diesel locomotive engines. My particular device is adapted for use where vertical space is available but horizontal space is quite limited. Prior to my invention, stack type oil bath filters, of which one form is shown in U. S. Patent No. 2,596,121, granted May 13, 1952, to J. K. Brixius, were commonly used since it is a generally long narrow filter of the type which would fit into such space. The stack type filter, due to its construction, is limited in its top velocity and could not filter as efficiently and as rapidly the same volume of air as the present invention.

Figure 1:
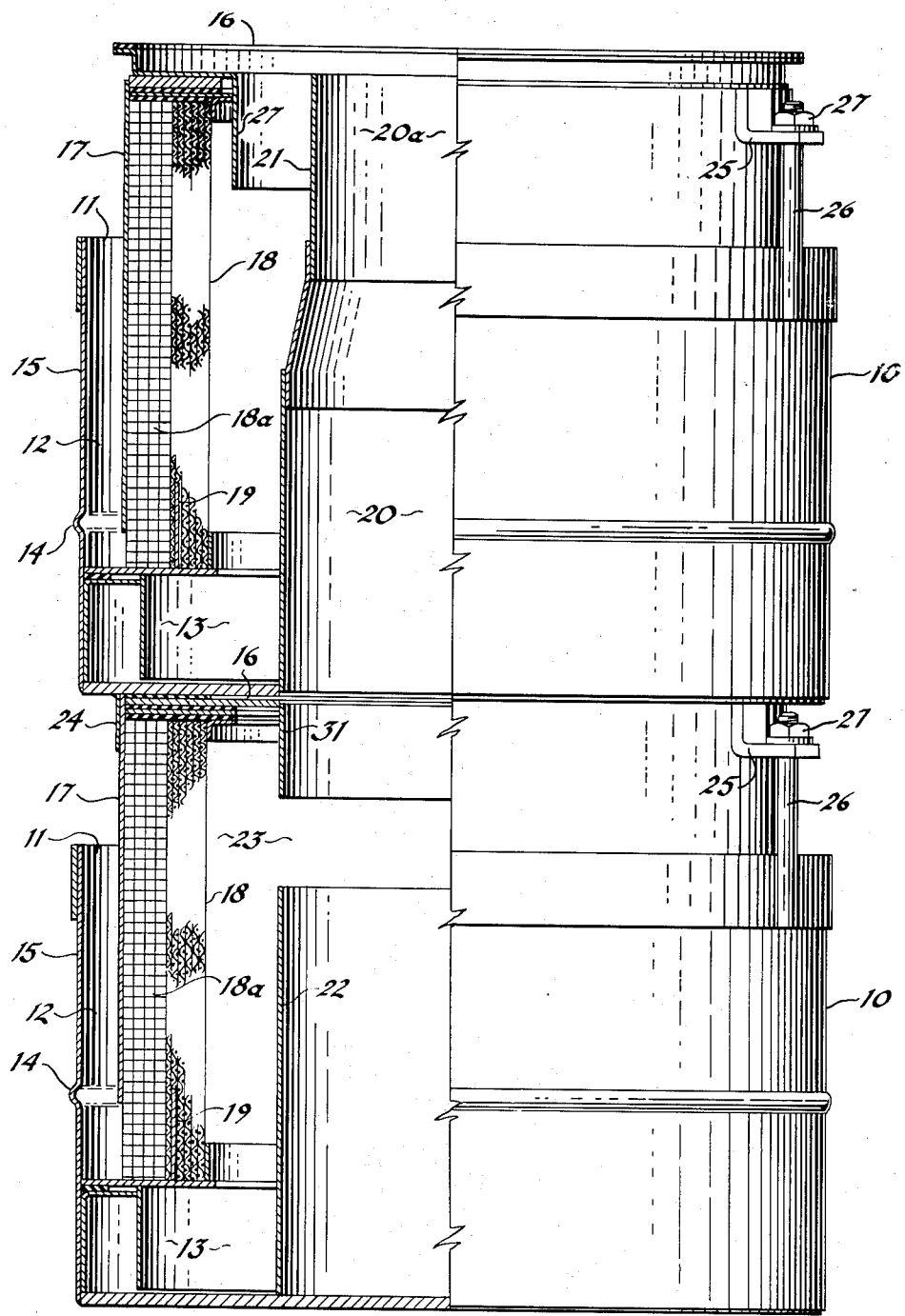
Fig. 1 is a view showing one embodiment of my improved tandem oil filter wherein the right hand half shows the device in side elevation while the left hand half shows a central sectional view.

As shown in Fig. 1, I have combined two high-capacity oil bath filters, one on top of the other in a novel manner, so as to maintain a greater filtering capacity with a very high efficiency in a relatively small and narrow space. Both upper and lower filters are identical in many respects and wherever feasible, the same reference numbers will be used to designate similar parts. An outer chamber or housing 10 is provided with air inlets 11 which lead into an annular chamber 12. The air is carried downwardly through the chamber into and through an oil bath 13, the oil being contained in a reservoir at the bottom of the housing 10, and maintained at the level of bead 14.

The bottom of said housing is in the form of a bowl 15 with side walls forming an outer rim. The cover or top 16 of said housing has attached to it, an annular downwardly depending skirt 17 which extends to a level near the bead 14. The skirt 17 is located radially inward of the side walls of the bowl 15 forming passageway 12 between the skirt 17 and the side walls of the bowl 15. Radially inward of the skirt 17 and usually attached thereto is an annular filter element 18 which depends downwardly from the cover to the bottom of the bowl. Said filter element 18 is associated with an outer oil-diffusing layer 18a, positioned against the skirt 17, which layer is of very coarse mesh material, such as hardware cloth having 3 or 4 meshes per inch each way. The filter element 18 is made up of a plurality of layers of corrugated relatively fine mesh screen.

A flexible, cylindrical baffle 19, formed of metal or felt, is rolled between the meshes of the filter screen and forms a portion of the filter element 18 near the bottom thereof and preferably extends slightly above the bottom of the skirt 17 so as to compel the air stream coming in from the passage 12 to pass upwardly after it goes under the skirt 17. It should be understood that as the entering air stream impinges the oil and becomes intermixed therewith, a certain quantity of oil will be carried upwardly inside of skirt 17 and distributed evenly over the filter element 18. The filtering element 18 may be formed in various ways and the specific description used herein is not intended in any limiting sense, but merely as illustrative of one of various ways of construction which may be used.

In the past, it has been found that the incoming air stream picks up oil due to its high velocity and throws it upwardly in globules toward the top of the filter element or pulls over to the interior of the filter element and eventually into the engine itself, which is very undesirable. For this reason, the outermost layer 18a is composed of hardware cloth, having a very open weave which breaks up these oil globules into small particles and more evenly distributes the oil over the face of the filter element 18.

The upper filter housing has a central hollow cylindrical tube 20 radially inward of said filter element and running all the way through the housing from a point flush with the top cover plate to the bottom. The tube 20 preferably has a tapered upper portion, as shown at 20a although this is not always necessary. This type of construction provides two main advantages. First, the tapered portion creates a larger radial passageway 21 between the filter element 18 and the cylindrical tube 20 for passage of the filtered air from the upper filter as it egresses from the filter element 18. The taper 20a is constructed so that the area of passageway 21 and the area of tube 20a are approximately equal.

Second, the lower portion of the tube 20, being of larger diameter, than the tapered portion, diminishes the size of the oil reservoir and thus keeps a smaller amount of oil in action in the upper filter unit.

The tube 20 is extended into the lower filter unit by means of a concentric cylindrical collar 31 fastened to the cover of the lower filter unit and having the same diameter as the bottom of tube 20 and axially aligned therewith. This collar provides an outlet for the filtered air of the lower unit as it egresses from the filter element 18. The bottom central portion of the lower filter unit is filled by means of a hollow cylindrical tube 22, having the same diameter as the tube 20. The tube 22 extends upwardly from the bottom of the bowl 15 to a point above the level of the oil 14, leaving a space 23 between its upper edge and the lower edge of collar 31, so that the filtered air may reach the central outlet provided by the collar 31.

The two filter housings 10 and 10' are maintained in alignment and contiguous one another by means of an annular lip or rim 24 on housing 10 which telescopically receives the upper portion of the cover 16 of the lower filter unit. Said lip 24 contains several downwardly and outwardly extending ears 25 on its outer periphery. Said ears receive bolts 26 which are fastened to the outer surfaces of the lower filter unit. A nut 27 upon each bolt pulls the two housings together and clamps them in aligned relationship.

It can readily be seen from the above description that dirty air enters chamber 12 of each unit, passes beneath skirt 17 picking up oil, and then passes radially inwardly through the associated filter element 18. During such operation the oil is depressed below bead 14 outside of element 18 and rises above bead 14 inside of the filter element due to the pressure differential on opposite sides of element 18. The filtered air from the lower filter unit enters the central tubular opening formed by collar 21 via the space 23 and passes up through the central tube 20, 20a of the upper filter unit.

The upper filter unit is provided with a cylindrical collar 27 depending from the cover 16 in the passageway 21 adjacent and radially inward from the filter element 18. The purpose of collar 27 is to prevent oil from traveling across the top of the filter element directly into the passageway 21.

The filtered air from the lower filter, passing through the central tube 20 and out the top of the upper filter at 20a provides an aspirator action in the passageway 21, so as to add to the air flow through the upper filter unit.

Those skilled in this art will appreciate that there are certain limiting factors which must be taken into account in high capacity oil bath filters. The first of these is critical air velocity, this being a velocity just below that where oil drops are carried radially inwardly from the filter element in the air stream, known as "pullover." If the air attains a velocity through the filter element beyond a certain predetermined limit, oil globules will be carried from the filter element to the outlet and into the engine intake.

The second limitation in the construction of high capacity oil bath filters is the vertical height of the filter element. As the air stream passes beneath skirt 17 and turns upwardly, it picks up oil from the oil bath reservoir 13 and distributes it over the filter element. Since the critical air velocity limits the velocity at which the air may travel, it also limits the maximum height the oil will be carried in the filter element. We may therefore define the maximum vertical height of a filter element as the height to which the critical velocity will carry oil and distribute it evenly over the filter element. To construct a filter having a filter element of greater height than this is wasteful and impractical, since only that portion of the filter element which is covered with oil is effective in filtering the air.

It can readily be seen that to construct a long, narrow filter housing with a long filter element and one inlet for air would be impractical and inefficient. Therefore, I have, by novel means herein set forth, combined two high capacity oil filters in a manner wherein both operate at their maximum efficiency and furthermore complement each other to make their combined operation more effective than two separate filters operating individually.

Figure 2:
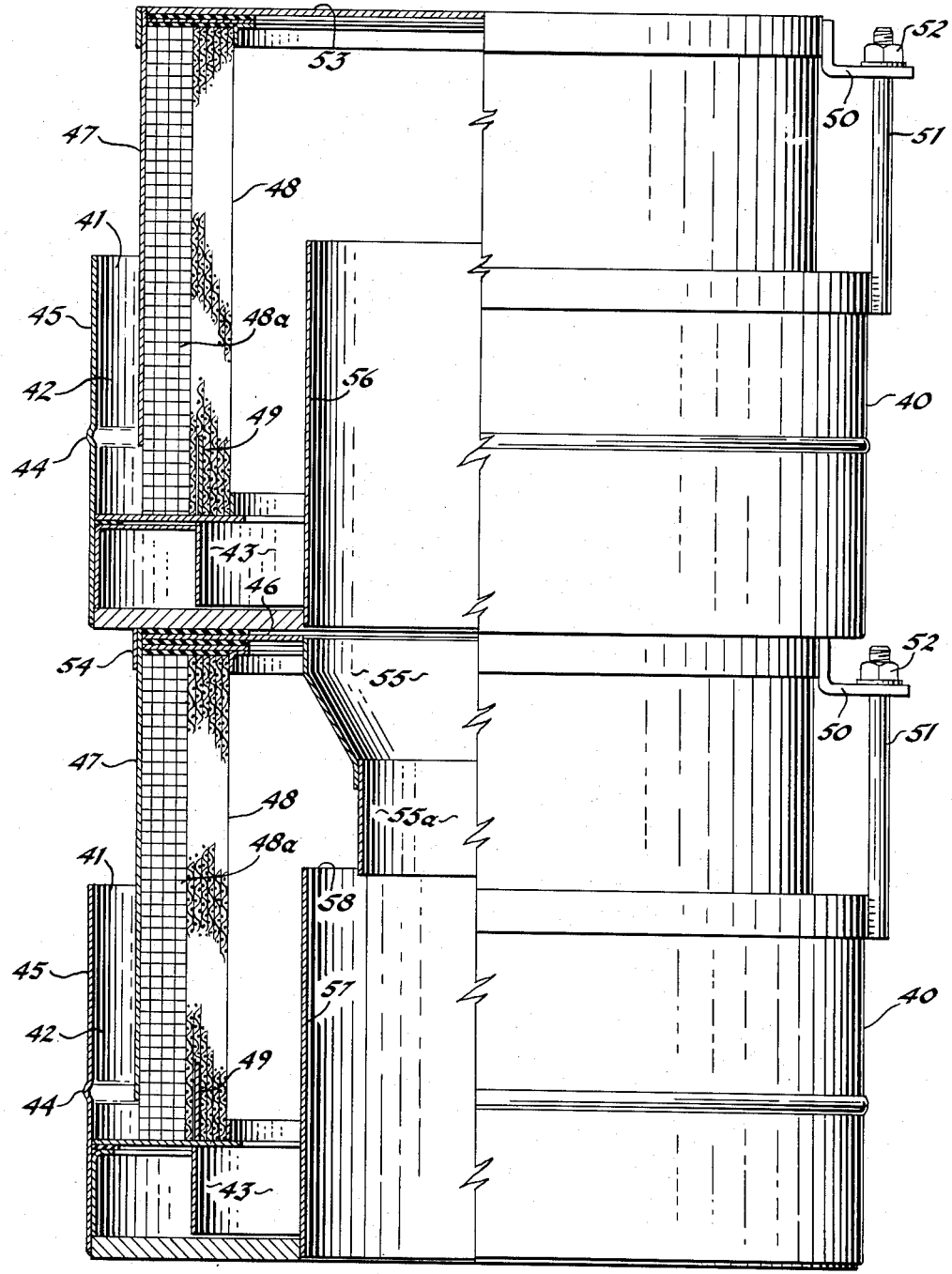
Fig. 2 is a view similar to Fig. 1 showing a modified form of my device.

In the modification of Fig. 2, I have shown a bottom outlet tandem oil filter. Here the filter housing parts 40 and 47 are like the parts 10 and 17 as previously described. The bottom of the housing 45 is like a bowl identical to that of 15. The annular filter elements 48 and 48a may be constructed as the elements 18 and 18a. Cylindrical baffle 49 is like 19 already described. Air inlet 41 leads into the annular chamber 42, and carries the air downwardly through oil bath 43 which is maintained at the level of bead 44. The air filtering process is exactly like that explained previously.

The two filter housings are maintained in alignment and contiguous one another by means of an annular lip 54 on housing 40 which telescopically receives the upper portion of cover 46 of the lower filter unit. The lip 54 contains several radially extending ears 50 which receive bolts 51. Bolts 51 are fastened to the outer surface of the lower filter units and a nut 52 on each bolt pulls the two housings together.

The top 53 of the upper filter unit does not contain an opening, differing in this respect from the top unit 16 of Fig. 1.

The chief difference between this modification and that previously described consists in the arrangement of the central tube 55 and the direction of air flow after it is filtered. The lower filter housing has a central hollow cylindrical tube 55 positioned radially inward of filter element 48 and extending downwardly into said lower filter housing. The tube 55 has a tapered lower portion, as shown at 55a although this is not always necessary. The tube 55 is extended into the upper filter unit by means of a concentric cylindrical collar 56 fastened to the bottom of the upper filter unit and having the same diameter as the tube 55 and axially aligned therewith. This collar extends into the upper filter unit a substantial distance; however, never so far as to reach the top 53. This collar provides a passageway for the filtered air of the upper filter unit as it leaves the filter element 48 and directs it downwardly into the central tube 55.

The bottom of the lower filter unit contains a second concentric cylindrical collar 47, having the same diameter as the tube 55 and aligned therewith. The collar 57 extends upwardly from the bottom of bowl 45 above the level of the oil 44 at a distance equal to approximately one-half the diameter of said collar. At this level the collar 57 is preferably at a level substantially flush with the tapered end 55a of central tube 55, although I have shown the tapered end 55a to extend slightly below the end of collar 57 in Fig. 2. The space between the upper end of collar 57 and the lower end of the tube 55a provides a passageway 58 through which the filtered air from the lower unit enters the inner or center portion of collar 57, and thence outwardly through the bottom of the lower filter unit.

The size of passageway 58 is critical and I have found by experimentation that its size should be 12% to 16% of the diameter of collar 57. Filtered air from the upper filter unit creates a suction at this tapered end 55a as it rushes through tube 55. This suction has an aspirating effect on the air passing through the lower filter unit and increases the velocity and quantity of the air flowing through said lower filter. I have found that this is true only so long as the size of the passageway is maintained within the limits heretofore set forth. Enlarging the size of said passageway beyond these limits destroys the aspirating effect and actually decreases the quantity of the filtered air flowing through the filter.

In actual practice, I have found the above-described "tandem type" filters will handle 2000 cubic feet of filtered air per minute or 2.65 cubic feet per minute per square inch of filter element under a pressure drop of 10 inches of water, whereas a large single filter, similar to either the upper or lower unit here described, and heretofore used for large volumes of air, required a pressure drop of 15 inches of water when handling filtered air at a rate of 2000 cubic feet per minute. Furthermore, due to the larger size of the single filter, its efficiency under such conditions was only 2.57 cubic feet of air per minute per square inch of filter element, as compared with 2.65 cubic feet of air per minute per square inch of filter element for my improved tandem-type filter. My tests further show that the single, large filter, previously used, required an operating pressure 50% greater than that of this new tandem-filter in order to handle the same quantity of filtered air. This means additional wear and shortened life for compressor units which draw the air through such filters.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of the invention.

What I claim is:

1. The combination of an upper filter unit and a lower filter unit positioned one upon the other aligned upon a vertical axis, said filters comprising generally cylindrical housings, said housings being connected together, each of said housings comprising a generally cylindrical cup-shape bowl opening upwardly and providing an oil reservoir, each of said housings having a downwardly extending annular skirt spaced radially inwardly from said bowl, each said skirt extending substantially to the level of the oil in its associated reservoir, said cylindrical cup-shape bowl combining with said skirt to provide an air inlet passageway therebetween, an annular filter element in each housing radially inwardly from said skirt, an annular baffle extending upwardly in said bowls to approximately the lower edge of said skirt and radially inwardly from said skirt, at least a portion of said filter element located radially outwardly of said baffle, a central hollow cylindrical tube positioned axially and extending through said upper filter unit, said tube being spaced radially inwardly from its associated filter element to provide an annular passageway therein, a central outlet from said lower unit being aligned with said tube, said lower unit discharging its filtered air directly into said central outlet to be carried through the upper central tube of the upper unit, and said upper unit discharging its filtered air into said annular passageway.

2. A combination of an upper filter unit and a lower filter unit positioned one upon the other, aligned upon a vertical axis, said filters comprising generally cylindrical housings, said housings being connected together, each of said housings comprising a generally cylindrical cup-shape bowl opening upwardly and providing an oil reservoir each of said housings having a downwardly extending annular skirt spaced radially inwardly from said bowl, each said skirt extending substantially to the level of the oil in its associated reservoir, an annular filter element in each housing radially inwardly from said skirt, said cylindrical cup-shape bowl combining with said skirt to provide an air inlet passageway therebetween, an annular baffle extending upwardly in said bowls to approximately the lower edge of said skirt and radially inwardly from said skirt, at least a portion of said filter element located radially outwardly of said baffle, a central hollow cylindrical tube positioned axially and extending through said upper filter unit, said tube being spaced radially inwardly from its associated filter element to provide an annular passageway therein, said tube having a tapered upper portion, a central outlet from said lower unit being aligned with said tube, said lower unit discharging its filtered air directly into said central outlet to be carried through the central tube of the upper unit, and said upper unit discharging its filtered air into said annular passageway.

3. The combination of an upper filter unit and lower filter unit positioned one upon the other aligned upon a vertical axis, said filters comprising generally cylindrical housings, said housings being connected together, each of said housings comprising a generally cylindrical cup-shape bowl opening upwardly and providing an oil reservoir, each of said housings having a downwardly extending annular skirt spaced radially inwardly from said bowl, each said skirt extending substantially to the level of the oil in its associated reservoir, said cylindrical cup-shape bowl combining with said skirt to provide an air inlet passageway therebetween, an annular filter element in each housing radially inwardly from said skirt, an annular baffle extending upwardly in said bowls to approximately the lower edge of said skirt and radially inwardly from said skirt, at least a portion of said filter element located radially outwardly of said baffle, a central hollow cylindrical tube positioned axially and extending through said upper filter unit, said tube being spaced radially inwardly from its associated filter element to provide an annular passageway therein, said tube having a tapered upper portion, the lower portion of said tube extended into the lower housing by means of a concentric cylindrical collar fastened to the lower housing and aligned with said tube, said lower unit discharging its filtered air directly into the central hollow tube to be carried through the central tube of the upper unit, and said upper unit discharging its filtered air into said annular passageway.

4. The combination of an upper filter unit and a lower filter unit positioned one upon the other aligned upon a vertical axis, said filters comprising generally cylindrical housings, said housings being connected together, each of said housings comprising a generally cylindrical cup-shape bowl opening upwardly and providing an oil reservoir, each said housings having a downwardly extending annular skirt spaced radially inwardly from said bowl, each said skirt extending substantially to the level of the oil in its associated reservoir, said cylindrical cup-shape bowl combining with said skirt to provide an air inlet passageway therebetween, an annular filter element in each housing radially inwardly from said skirt, an annular baffle extending upwardly in said bowls to approximately the lower edge of said skirt and radially inwardly from said skirt, at least a portion of said filter element located radially outwardly of said baffle, a central hollow cylindrical tube positioned axially and extending through said upper filter unit, said tube being spaced radially inwardly from its associated filter element to provide an annular passageway therein, said tube having a tapered upper portion, the lower portion of said tube extended into the lower housing by means of a first concentric cylindrical collar fastened to the lower housing and aligned with said tube, a second concentric cylindrical collar aligned with said upper collar and extending upwardly from the bottom of said lower unit to a position above the level of the oil reservoir and below said first collar, for reducing the amount of oil in action in said lower unit, said lower unit discharging its filtered air directly into the central hollow tube to be carried through the central tube of the upper unit, and said upper unit discharging its filtered air into said annular passageway.

5. The combination of an upper filter unit and a lower filter unit positioned one upon the other aligned upon a vertical axis, said filters comprising generally cylindrical housings, said housings being connected together, each of said housings comprising a generally cylindrical cup-shape bowl opening upwardly and providing an oil reservoir, each of said housings having a downwardly extending annular skirt spaced radially inwardly from said bowl rim, each said skirt extending substantially to the level of the oil in its associated reservoir, said cylindrical cup-shape bowl combining with said skirt to provide an air inlet passageway therebetween, an annular filter element in each housing radially inwardly from said skirt, an annular baffle in said housings extending upwardly in said bowl to approximately the lower edge of said skirt and radially inwardly from said skirt, a top on said upper filter unit and a bottom on said lower filter unit providing opposed end walls, the downstream one of said end walls having a centrally located through discharge opening, a central hollow cylindrical tube positioned axially in each unit, said tube being spaced radially inwardly from its associated filter element to provide an annular passageway there, said central tube of the downstream unit communicating with said discharge opening, and there being central openings in each unit in communication with each other, the central tube of the upstream unit discharging its filtered air through said communicating central openings.

6. The combination of claim 5 wherein said central hollow cylindrical tube in said lower filter unit extends downwardly and is provided with a tapered lower portion, a concentric cylindrical collar aligned with said central tube and extending upwardly from the bottom of said lower unit to at least a plane level with the tapered end of said tube, said cylindrical collar communicating with said discharge opening, said upper unit discharging its filtered air into the central hollow cylindrical tube of the upper unit which is thence carried downwardly through the hollow cylindrical tube of said lower unit and said cylindrical collar, and said lower unit discharging its filtered air into said cylindrical collar by means of a passageway between said cylindrical collar and tapered portion of said tube.

7. The combination of claim 5 wherein said central hollow cylindrical tube positioned in said lower filter unit is provided with a tapered lower portion, conduit means providing communication between said tapered lower portion and said discharge opening, said upper unit discharging its filtered air into said central hollow cylindrical tube positioned in said upper filter unit whereby it is carried downwardly through said cylindrical tube in said lower filter unit and said conduit means, said lower filter unit discharging its filtered air directly into said conduit means.

References Cited in the file of this patent

UNITED STATES PATENTS

| 2,377,142 | Glanzer | May 29, 1945 |
| 2,596,148 | Hanneman et al. | May 13, 1952 |

FOREIGN PATENTS

| 845,338 | France | Aug. 18, 1939 |